(12) United States Patent
Schmidt

(10) Patent No.: US 8,899,121 B2
(45) Date of Patent: Dec. 2, 2014

(54) SPINDLE DRIVE

(75) Inventor: Roland Schmidt, Riegelsberg (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 326 days.

(21) Appl. No.: 13/328,191

(22) Filed: Dec. 16, 2011

(65) Prior Publication Data

US 2012/0198951 A1 Aug. 9, 2012

(30) Foreign Application Priority Data

Feb. 7, 2011 (DE) .......................... 10 2011 003 698

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/24* | (2006.01) |
| *B23Q 5/40* | (2006.01) |

(52) U.S. Cl.
CPC ................ *F16H 25/24* (2013.01); *B23Q 5/404* (2013.01); *F16H 2025/2436* (2013.01)
USPC ........ 74/89.39; 74/89.23; 74/89.31; 74/89.36

(58) Field of Classification Search
USPC ......................... 74/89.23–89.29, 89.3–89.39
See application file for complete search history.

(56) References Cited

U.S. PATENT DOCUMENTS

| | | | |
|---|---|---|---|
| 2,885,920 A | | 5/1969 | Livingston |
| 4,532,869 A | * | 8/1985 | Kondo et al. ................. 104/166 |
| 5,537,912 A | * | 7/1996 | Miyamoto et al. ................. 92/88 |
| 5,568,982 A | * | 10/1996 | Stoll et al. ......................... 384/55 |
| 6,007,247 A | * | 12/1999 | Rosengren et al. ............. 384/41 |
| 6,301,983 B1 | * | 10/2001 | Andreasson ................. 74/89.36 |
| 6,796,199 B2 | * | 9/2004 | Kurz ............................ 74/89.32 |
| 7,093,510 B2 | * | 8/2006 | Andreasson ................. 74/89.36 |
| 8,079,279 B2 | * | 12/2011 | Brechelente ................ 74/89.39 |
| 8,402,853 B2 | * | 3/2013 | Pfister et al. ................. 74/89.32 |
| 2003/0029259 A1 | * | 2/2003 | Kurz ............................ 74/89.33 |
| 2009/0084145 A1 | * | 4/2009 | Sugimoto ....................... 70/186 |
| 2010/0209029 A1 | * | 8/2010 | Pfister et al. ................... 384/45 |
| 2012/0198951 A1 | * | 8/2012 | Schmidt ...................... 74/89.23 |

FOREIGN PATENT DOCUMENTS

| | | |
|---|---|---|
| DE | 19636272 | 3/1998 |
| EP | 0993568 | 9/2002 |

* cited by examiner

*Primary Examiner* — Troy Chambers
*Assistant Examiner* — Alexander Vu
(74) *Attorney, Agent, or Firm* — Volpe and Koenig, P.C.

(57) ABSTRACT

A spindle drive having a threaded spindle driveable in a rotational fashion, a carriage adjustable via the threaded spindle along a guide rail, and several guide carriages arranged in front and behind the carriage in the feed direction to support the spindle, with the guide carriages arranged in front of the carriage in an accumulating motion being pushed together successively by the carriage towards the spindle end, and with the guide carriages arranged behind the carriage being entrained by a coupling mechanism and moved into allocated support positions. Coupling elements are provided on the guide carriages and the carriage, that cooperate together and can be operated by switching elements fixed on the guide rail, by which the guide carriages arranged in front of the carriage are automatically coupled during the successive displacement motion, and by which the entrained guide carriages upon reaching their support position are automatically decoupled and fixed.

6 Claims, 7 Drawing Sheets

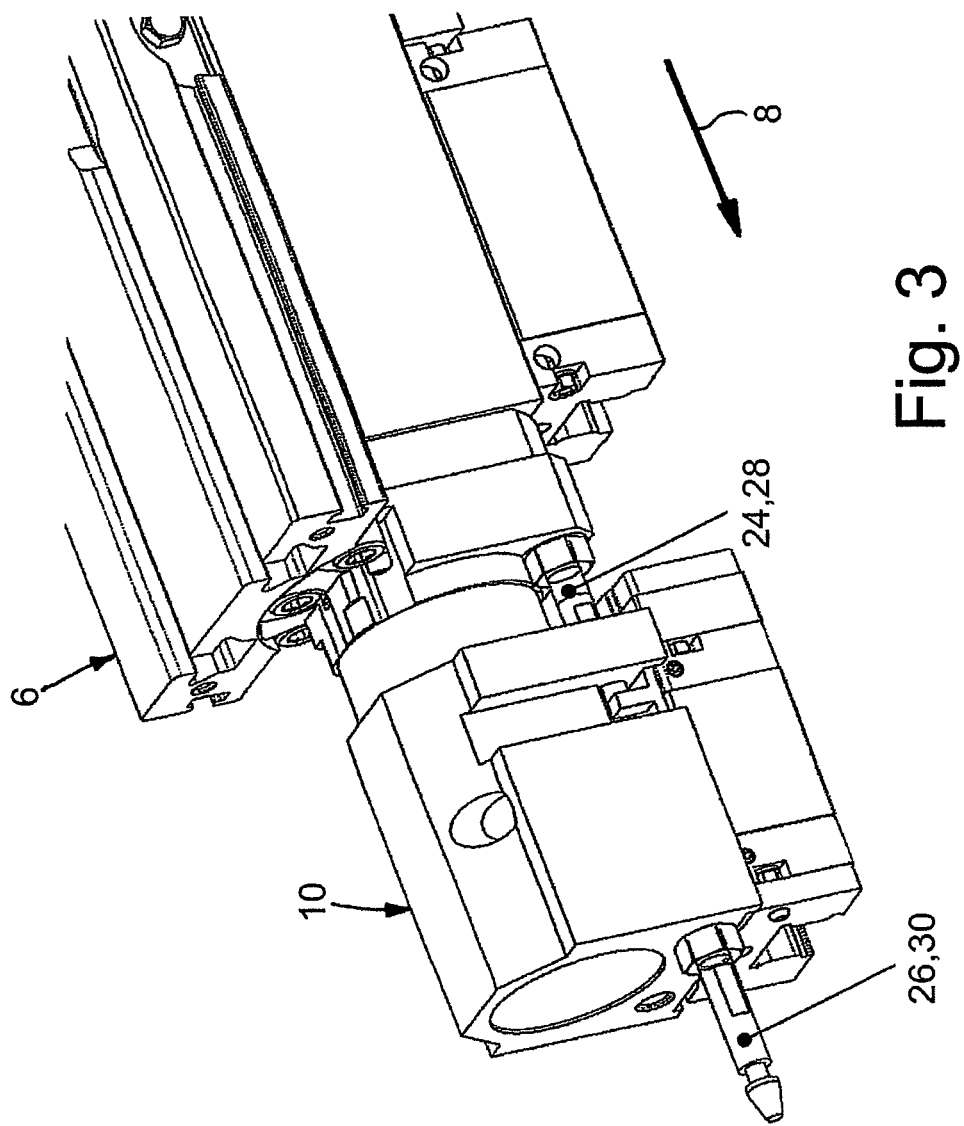

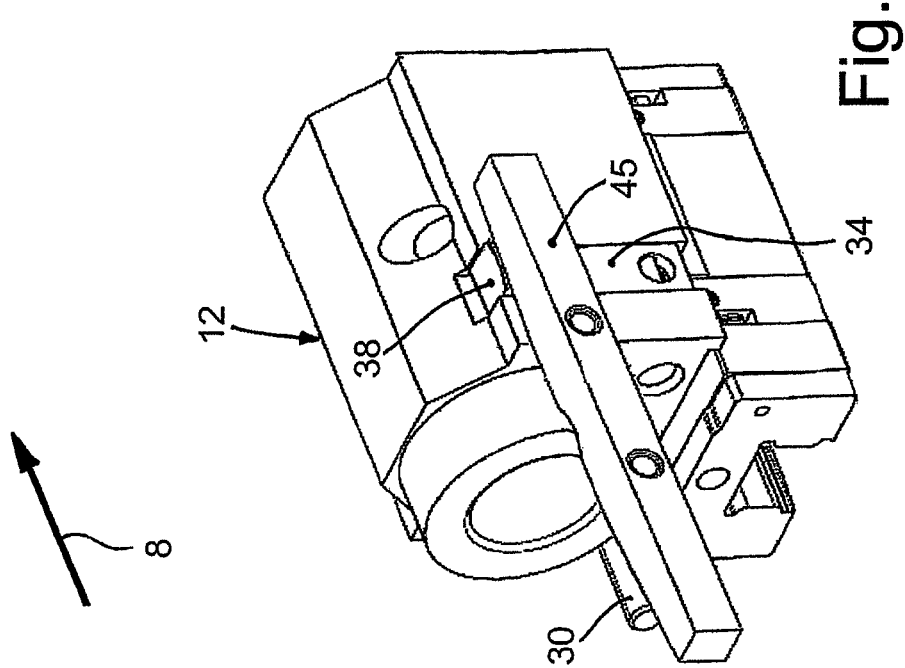
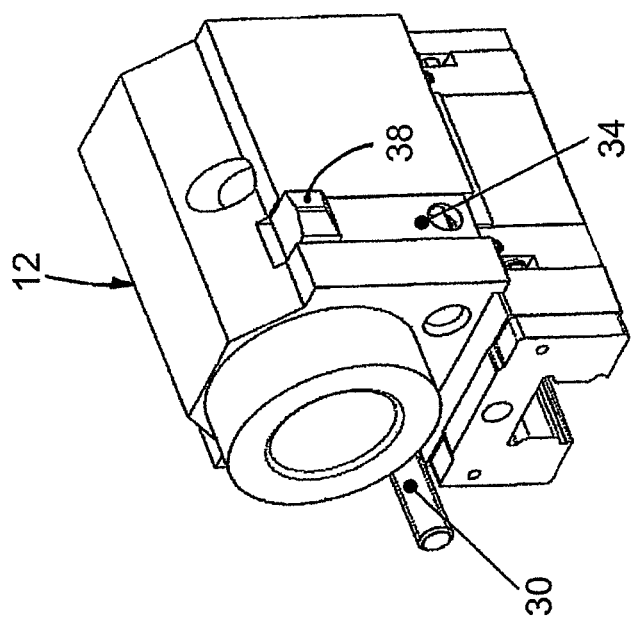

SPINDLE DRIVE

CROSS-REFERENCE TO RELATED APPLICATIONS

This application claims the benefit of German Patent Application No. 10 2011 003 698.9, filed Feb. 7, 2011, which is incorporated herein by reference as if fully set forth.

BACKGROUND

The invention relates to a spindle drive comprising a threaded spindle that can be driven rotationally, a carriage displaceable along a guide rail via said threaded spindle, as well as several guide carriages arranged in front and behind the carriage in the direction of the spindle axis for supporting the threaded spindle, with in an advancing motion of the carriage the guide carriages arranged in front thereof being successively pushed together by the carriage and moved towards one end of the spindle, and with the guide carriages arranged behind the carriage being dragged via a coupling mechanism and being moved into an allocated support position.

Such spindle drives are frequently used for a motorized drive of linearly movable parts, for example machine tables, coordinate measurement devices, and the like. In the part to be moved a spindle nut is arranged with an internal thread matching the external thread of the threaded spindle, which during the rotation of the threaded spindle, is moved along the spindle axis and entrains the part to be moved.

In such a spindle drive the maximum drive speed of the carriage depends on the critical rotation speed of the threaded spindle. Upon reaching the critical rotation the threaded spindle is set into natural oscillation, which aggravates a precise positioning of the carriage or renders it even impossible. Relevant factors determining a critical rotation speed are the diameter of the threaded spindle and particularly its length. The smaller the ratio of the diameter in reference to the length of the threaded spindle the lower the critical rotation speed of the threaded spindle and thus the feed rate that can be achieved. Due to the fact that particularly in large length threaded spindles (e.g., several meters) the diameter of the spindle cannot be arbitrarily increased for reasons of dimensions and/or weight, such threaded spindles are additionally supported by so-called guide carriages in the area between the carriage and the end of the spindle, so that the length of the free, not supported spindle sections is shortened. The critical rotation speed of the threaded spindles and thus the maximum feed rate of the carriage achievable can be considerably increased this way. In a feed motion, the guide carriages are pushed together in a shortening spindle section and moved towards the allocated end of the spindle, while the guide carriages are distributed over the extending spindle section in a continuously adjusted fashion.

From DE 196 36 272 A1 a spindle drive is known in which the guide carriages, here called spindle support units, are connected to each other in pairs or via a pulley-like connection to the carriage. As is easily discernible, for example from FIG. 10 of this publication, such solutions are of extremely complicated construction and extensive in their technical assembly because numerous pulley cables must be installed and connected to the guide carriage and/or the carriage. This particularly applies if more than two guide carriages are arranged in front and/or behind the carriage so that such a design with more than two guide carriages can hardly be implemented according to this principle.

SUMMARY

In light of this background the invention is based on the objective of providing a spindle drive of the type mentioned above, which is of simple design as well as reliable, and which also allows to arrange more than two guide carriages in front and/or behind the carriage on the threaded spindle.

This objective is attained according to the invention, with advantageous embodiments and further developments of the invention being provided below and in the claims.

The invention is based on the acknowledgement that particularly the placement of the guide carriages entrained to their predetermined support positions can be simplified when it is possible to implement this placement by switching means arranged at said placement positions.

Accordingly, the invention is based on a spindle drive, comprising a threaded spindle that can be rotationally driven, a carriage adjustable via the threaded spindle along a guide rail, as well as several guide carriages arranged in the direction of the spindle axis in front and behind the carriage to support the threaded spindle, with the guide carriages arranged in front of the carriage during the driving and/or advancing motion being successively pushed together by the carriage and moved towards a spindle end, and with the guide carriages arranged behind the carriage being dragged by a coupling mechanism and moved into an allocated support position.

In order to attain this objective it is here provided that coupling means are provided, cooperating with each other on the guide carriages and on the carriage, which can be operated by switching means arranged fixed on the guide rail, by which the guide carriages arranged in front of the carriage can be automatically coupled to the guide carriages respectively approaching from the rear in the subsequent displacement motion, and by which the dragged guide carriages upon reaching their support position are successively and automatically decoupled and placed.

When the carriage is moved in a feed direction for example from a central position, in which the guide carriages are each equally distributed over the threaded spindle sections in front and/or behind the carriage, respectively, it approaches the closest positioned first guide carriage in the feed direction, with the coupling means arranged on the carriage on the one side and on the guide carriage on the other side reach a coupling position. During the further feed motion the group comprising the carriage and guide carriage pass the switching means allocated to the guide carriage, which brings the coupling means into a coupling engagement.

In a further feed motion, in the same manner the first guide carriage is coupled to the subsequent guide carriage etc., and the group comprising carriage and guide carriages pushed together form a block that is displaced in the direction towards the end of the spindle.

In an inverse motion of the carriage the coupled guide carriages are entrained, beginning with the guide carriage farthest apart from the carriage, with all guide carriages successively being decoupled and placed at the allocated support position.

For the coupling means and the switching means different optional designs are possible. According to a preferred embodiment of the invention it is provided that a first coupling element is provided on each guide carriage, cooperating with a second coupling element arranged on the guide carriage and/or the carriage accumulating during the feed motion. Here, one of the coupling elements of a pair of coupling elements can be switched between a locked position and an unlocked position. Additionally, on the guide rail, in the area of the support position a switching ramp or the like is arranged each, which switches the switchable coupling element of the guide carriage allocated to this support position when being displaced out of the support position into a locking state and when being displaced into the support position into its unlocked state. The coupling and decoupling of the guide carriages therefore occurs fully automatically and in a purely mechanical fashion.

Another alternatively designed embodiment of the invention provides that the second coupling element can be arranged fixed on a guide carriage and the carriage, respectively, embodied as a locking pin extending in the accumulating direction, which penetrates into a receiving bore of a guide carriage to be coupled. Additionally it is provided that the first coupling element is embodied as a latch, adjustable perpendicularly in reference to the axis of the locking pin and engaging a latching groove embodied on the locking pin, which via a switching cam arranged thereat and cooperating with the switching ramp is moved in the unlocking direction against the force of springs. The springs therefore serve to pre-stress the latch in the direction of the locking position.

In another embodiment of the invention it is provided that the switching ramp is embodied as a separate switching bar, that can be inserted into an allocated recess on the inside of a lateral wall of the guide rail, which is U-shaped in its cross-section. The position of the switching bar therefore determines the support position of an allocated guide carriage.

According to another embodiment of the invention, a latching recess is provided on the switching bar, engaged by the latch allocated to the switching cam in order to fix the guide carriage in its support position.

In a preferred embodiment of the spindle drive, the guide carriage comprises a housing with a penetrating opening for the threaded spindle and a slide bush arranged in the penetrating opening and receiving and supporting the threaded spindle, with at least one receiving bore being arranged in the housing each for receiving the locking pin, at least one recess for receiving and guiding a latch, and a locking pin projecting in the feed direction, as explained in greater detail using the exemplary embodiment below.

Preferably, the housing is embodied with respect to a plane perpendicular in reference to the bottom wall of the guide rail and comprising the axis of the threaded bore symmetrical, with recess bores arranged on both sides of the plane for a locking pin and one recess each for a latch. According to a preferred embodiment of the invention this constructive design allows that in front and behind the carriage one group each of four guide carriages can be provided. Here, the latches of the four guide carriages of a group are embodied and arranged such that one switching cam each of a guide carriage for example is arranged at the right side with regards to the accumulating direction and in a lower section of the housing, the switching cam of another guide carriage on the right side in the upper section of the housing, the switching cam of another guide carriage on the left side in the lower section, and the switching cam of another guide carriage on the left side in the upper section of the housing, with four switching bars accordingly being arranged at the interior side of the right and/or left lateral wall of the guide rail being arranged at a height according to the position of the switching cams.

BRIEF DESCRIPTION OF THE DRAWINGS

The invention will be further explained using an exemplary embodiment. For this purpose, a drawings are provided for the description. Show are:

FIG. 3 is an enlarged view of the carriage and the guide carriages adjacent thereto according to FIG. 2, FIGS. 7 and 8 are views of the guide carriage spaced apart from the carriage according to FIG. 4 in illustrations similar to FIGS. 5 and 6.

DETAILED DESCRIPTION OF THE PREFERRED EMBODIMENTS

Figure 1:
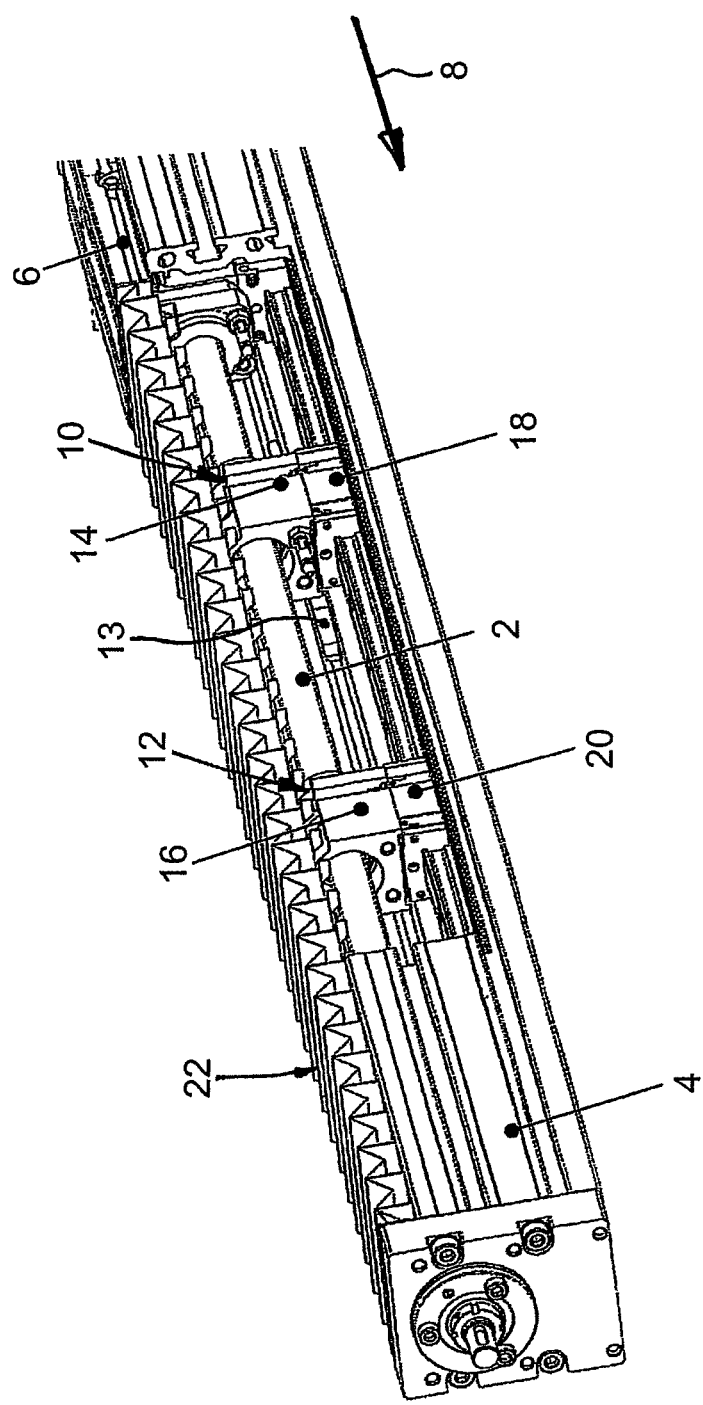
FIG. 1 is a perspective, partially cross-sectional view of an end section of a guide rail with a carriage and two guide carriages, not coupled to the carriage and arranged in front of it in the feed direction, namely in a view from the front left with regards to the feed direction.

The spindle drive shown in FIG. 1 comprises a threaded spindle 2 that can be rotationally driven, a carriage 6 adjustable via the threaded spindle 2 along a guide rail 4, for example carrying a machine table, as well as two guide carriages 10 and/or 12 arranged along the threaded spindle 2 and in front of the carriage 6 in the assumed feed direction 8 for supporting the threaded spindle 2, with in this exemplary embodiment the guide carriages 10, 12 each comprising an upper housing 14 and/or 16 for receiving the threaded spindle 2 and a lower long-term lubrication unit 18 and/or 20 guided on the guide rail. The spindle drive is covered and protected at the top by a bellows 22.

When the carriage 6 is moved in the feed direction 8 it is first automatically coupled to the most closely located guide carriage 10. In a further feed motion then the first guide carriage 10 is automatically coupled to the second guide carriage 12, and the combined group comprising the carriage 6 and the guide carriages 10, 12 moves further in the direction towards the end of the spindle.

It is mentioned here that for reasons of better visibility only two guide carriages 10, 12 are shown, positioned in front of the carriage 6 of the group, however, said group may easily comprise more than two, as explained in the following.

In a reverse motion of the guide carriage, i.e. opposite the feed direction marked 8, the group moves to a support position of the second guide carriage 12 shown in FIG. 1, where it is automatically decoupled. Then, the group comprising the carriage 6 and the guide carriages 10 moves to the support position of the first guide carriage 10, where it is also automatically decoupled. In a further motion of the carriage 6 it runs to the guide carriage arranged at the other side of the carriage 6, not shown in FIG. 1, and entrains it in an analogous manner from its respective support position in the direction towards the other spindle end, as explained above. The coupling and decoupling occurs via the switching means 13, arranged on the guide rail, as explained in the following.

Figure 2:
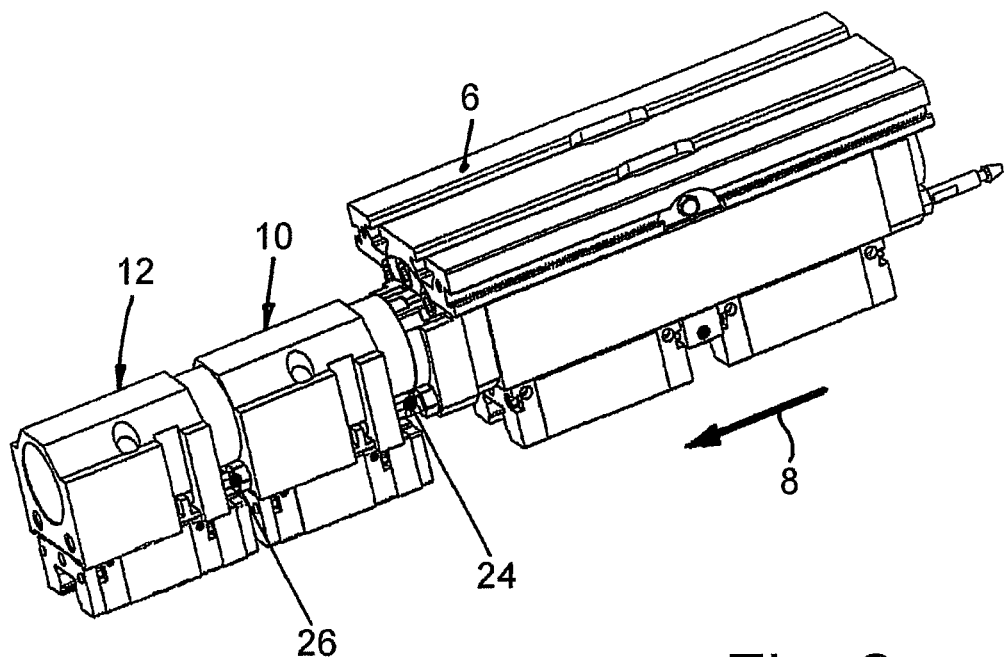
FIG. 2 is a view of the carriage and the guide carriages according to FIG. 1 in a state coupled to each other.

FIG. 2 shows the carriage 6 and the guide carriages 10 and 12 coupled therewith. The coupling means for coupling the first guide carriage 10 to the carriage 6 comprise a first coupling element, not shown, arranged on the guide carriage 10, which cooperates with a second coupling element 24 arranged on the carriage 6, as described in greater detail in the following. Similarly, the coupling means for coupling the second guide carriage 12 to the first guide carriage 10 comprise a first coupling element, not shown, arranged on the second guide carriage 12, which cooperates with a second coupling element 26 arranged on a first guide carriage 10. The first coupling elements, not shown in FIG. 2, are switched between a locked position and an unlocked position by the switching means 13 (see FIG. 1) arranged on the guide rail, as explained in the following.

FIG. 3 in turn shows the carriage 6 and the first guide carriage 10. As discernible in FIG. 3, the second coupling element 24 arranged on the carriage 6 comprises a locking pin 28, which during the approach of the carriage 6 towards the guide carriage 10 penetrates a receiving bore embodied in the guide carriage 10 and here is latched with a first coupling element as explained in greater detail with reference to FIGS. 5 through 9. In the same manner, the second coupling element 26 arranged on the first guide carriage 10 comprises a locking pin 30, which penetrates a receiving bore embodied in the second guide carriage, not shown, and is latched here.

Figure 4:
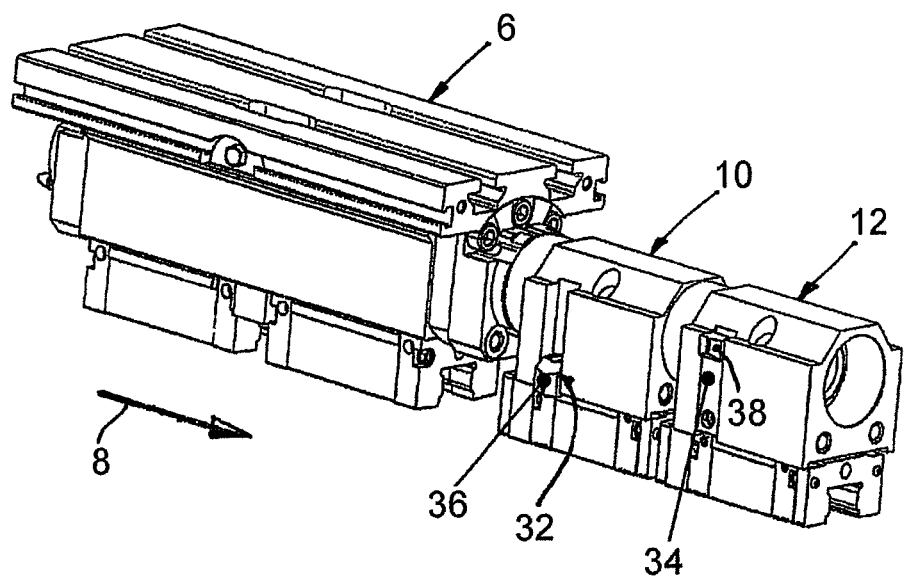
FIG. 4 is a view of the arrangement according to FIG. 2 taken from the front right with regards to the feed direction.

FIG. 4 shows the arrangement according to FIG. 2 in a view from the right with regards to the feed direction 8. Here, the latches 32 and/or 34 are discernible, arranged perpendicularly in reference to the feed direction and movable on the guide carriages 10, 12, cooperating with the locking means 28 and/or 30, which represent the above-mentioned first coupling elements. As already explained above, the latches 32, 34 are operated via switching cams 36 and/or 38 of switching ramps, which are arranged on the guide rail 4 in the area of the respectively allocated support positions.

Figure 5:
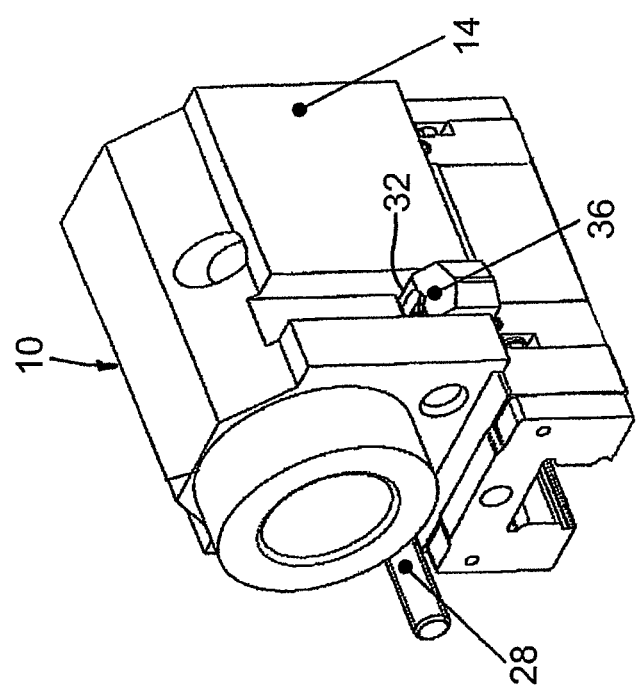
FIG. 5 is a view of the guide carriage adjacent to the carriage according to FIG. 4 from the right rear in an enlarged illustration with a latch acting left with regards to the feed direction.

FIG. 5 shows the guide carriage 10 in an enlarged illustration. Here, the locking pin 28 is discernible, arranged on the carriage, not shown, and engaging a receiving bore of the guide carriage 10, which by the displacement of the latch 32 via its switching cam 36 perpendicular in reference to the longitudinal axis of the locking pin 28 is locked and/or unlocked, thus coupling the guide carriage 10 with the carriage 6 and/or decoupling it therefrom. As discernible from FIGS. 5 and 6, the switching cam 36 is arranged at the right side in reference to the feed direction 8 as well as in a lower section of the housing 14 and cooperating with a switching ramp 40 fastened to the guide rail at a respective position, embodied on the switching bar 41 fastened on the guide rail.

When the guide carriage 10 is entrained in a feed direction 8 from its support position, in which the switching cam 36 is latched in the latching recess 43 of the switching bar 41, the switching cam 36 is pushed out of the latching recess and glides along the switching ramp 40. Here, the bar 32 is displaced by springs 56 into its locking position and the guide carriage 10 is coupled to the carriage 6. In a movement in the opposite direction the switching cam 36 of the guide carriage 10 entrained by the carriage 6 runs onto the switching ramp 40, with the bar 32 being unlatched, and engages the latching recesses 43 so that the guide carriage 10 remains in its support position.

Figure 6:
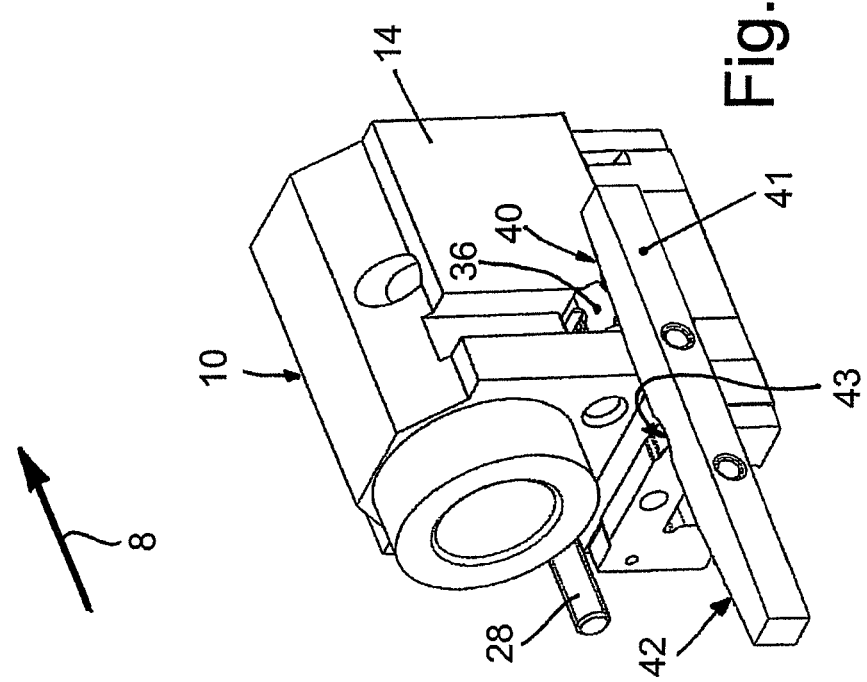
FIG. 6 is a view of the guide carriage according to FIG. 5, with an allocated switching bar.

The switching ramp 42, also embodied on the switching bar 41 and discernible in FIG. 6, switches in a similar manner the coupling means to a guide carriage 10 arranged at the other side of the carriage 6, which then receives the support position cleared by the guide carriage 10, which requires no detailed explanation.

In an illustration similar to FIGS. 5 and 6, FIGS. 7 and 8 show the guide carriage 12, which essentially differs from the guide carriage 10 only in that the switching cam 36 of the latch 34 is arranged at the right side in the upper section of the housing 14 of the guide carriage 12 and which cooperates with the switching bar 45 appropriately arranged in the guide rail in order to lock and/or unlock the latch 34 with the corresponding locking pin 30.

Figure 9:
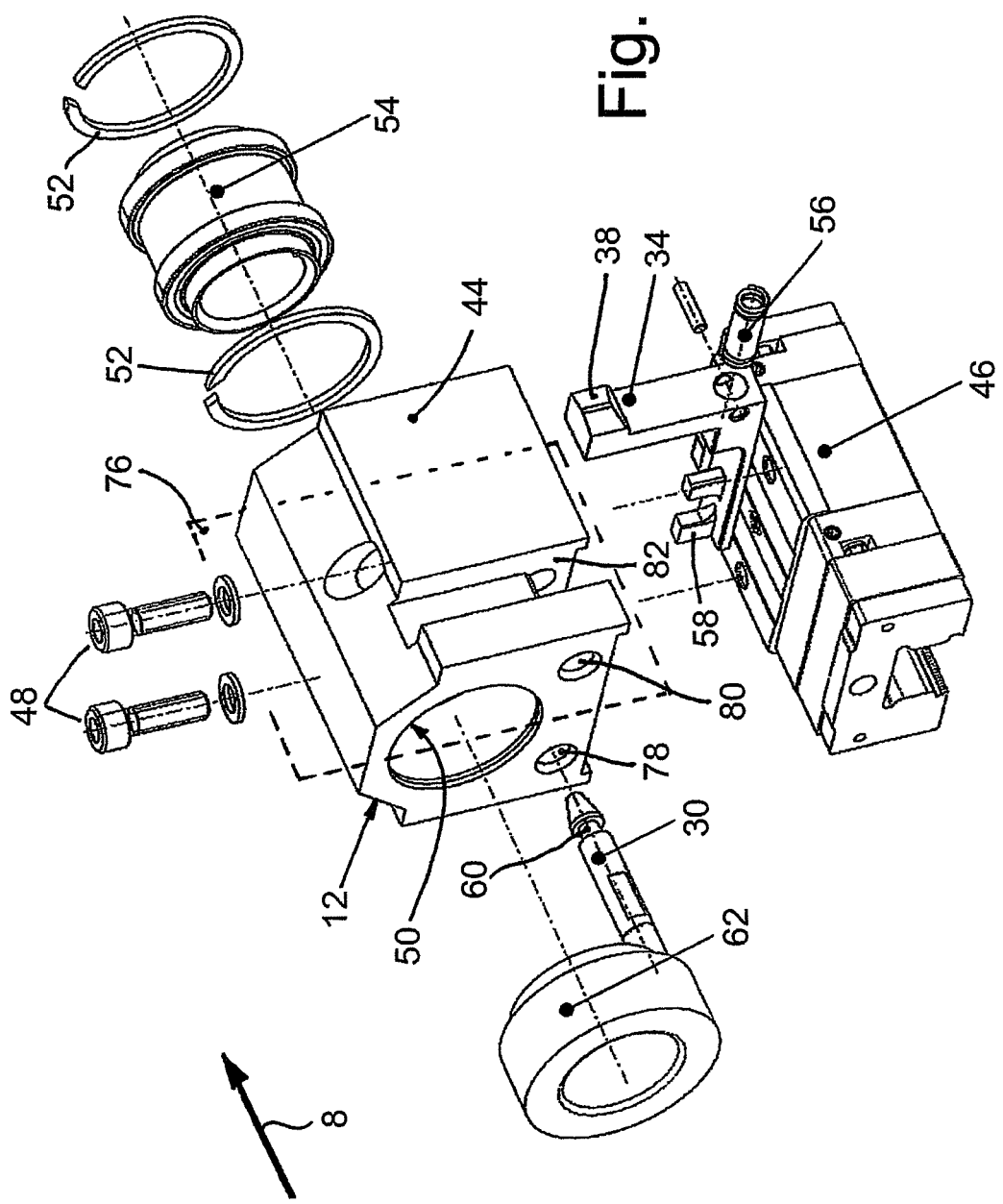
FIG. 9 is an exploded view of the guide carriage according to FIGS. 7 and 8.

FIG. 9 shows the guide carriage 12 in an exploded illustration. Shown are a housing 44, a long-term lubrication unit 46, which is connected to the housing 44 via threaded bolts 48, further a slide bush 54 arranged in a penetrating opening 50 of the housing 44, axially secured by circlips 52, for example provided with an internal thread and fixed rotationally to support the threaded rod, not shown, and the latch 45 with a switching cam 38 adjusted in the housing 44 perpendicular in reference to the feed direction 8. As already explained, a displacement of the latch 34 towards the right by the springs 56 with regards to the feed direction causes a locking with the locking pin 30. Here, projections 58 arranged on the latch 34 engage a latching groove 60 embodied on the locking pin 30. A movement of the latch 34 in the opposite direction leads to its unlocking.

A damping element is marked 62, which dampens the approach of the carriage to the guide carriage. Respective damping elements are provided at the axial ends of all guide carriages.

As further discernible in FIG. 9, the housing 44 is designed symmetrical with respect to a plane of symmetry 76, i.e. at both sides of the plane of symmetry 76 a receiving bore 78, 80 is provided to accept a locking pin as well as a recess (with only one recess 82 being visible) in order to allow four locking constellations and thus groups with four guide carriages, i.e. left acting and right acting latches each with cams at the top and cams at the bottom.

Figure 10:
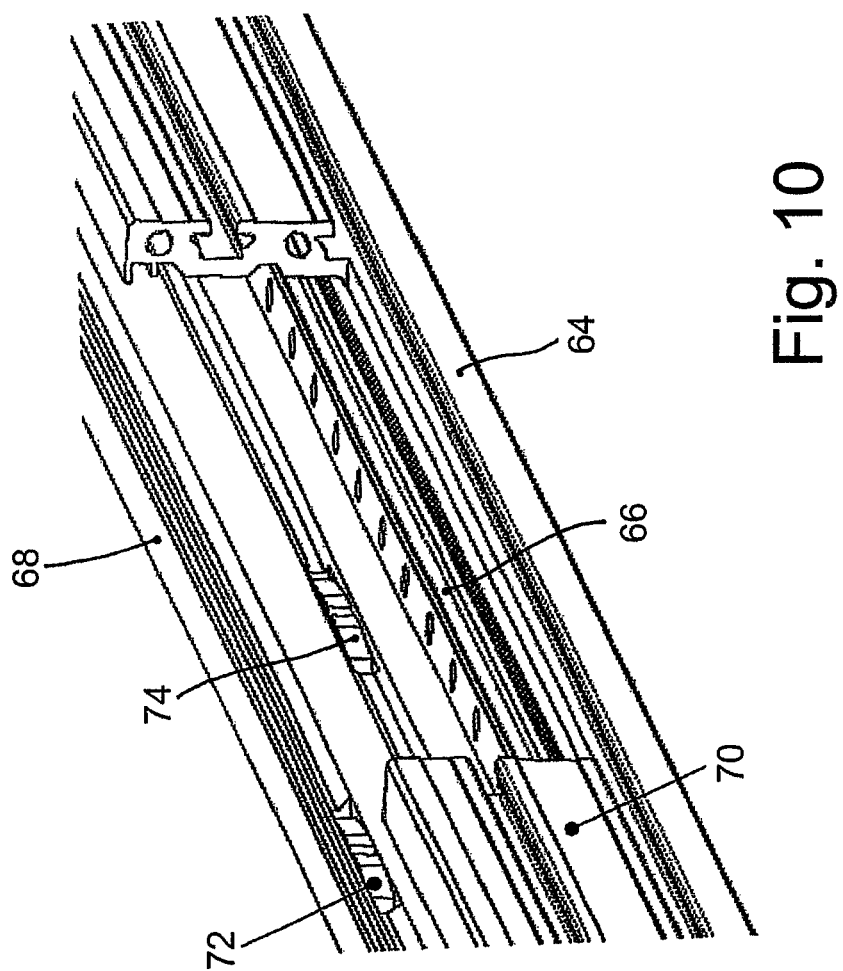
FIG. 10 is a view, partially cross-sectioned illustration, of a guide rail with switching bars arranged therein.

FIG. 10 shows a guide rail 64 with an approximately U-shaped cross-section comprising a floor wall 66 and two lateral walls 68, 70, with the lateral wall 70 being partially removed at the side facing the observer. At the lateral wall 68 two switching bars 72 and 74 are discernible, with the switching bar 72 being arranged higher according to a switching cam of a latch arranged at the top and the switching bar 74 arranged lower according to a switching cam of a latch arranged at the bottom.

LIST OF REFERENCE CHARACTERS

2 Threaded spindle
4 Guide rail
6 Carriage
8 Feed direction
10 Guide carriage
12 Guide carriage
13 Switching means
14 Housing
16 Housing
18 Long-term lubrication unit
20 Long-term lubrication unit
22 Hide
24 Coupling element
26 Coupling element
28 Locking pin
30 Locking pin
32 Latch
34 Latch
36 Switching cam
38 Switching cam
40 Switching ramp
41 Switching bar
42 Switching ramp 43 Latching recess
44 Housing
45 Switching bar
46 Long-term lubrication unit
48 Threaded bolt
50 Penetrating opening
52 Circlips
54 Slide bush
56 Spring
58 Projections on the latch
60 Latching groove
62 Damping element
64 Guide rail
66 Bottom wall
68 Lateral wall
70 Lateral wall
72 Switching bar
74 Switching bar
76 Plane of symmetry
78 Receiving bore
80 Receiving bore
82 Recess

The invention claimed is:

1. A spindle drive comprising a threaded spindle that can be rotationally driven, a carriage displaceable via the threaded spindle along a guide rail, as well as several guide carriages arranged in a direction of a spindle axis to support the threaded spindle, with the guide carriages arranged in a feed direction being pushed together successively by the carriage and being moved towards an end of the spindle, and with the guide carriages arranged in a direction opposite to the feed direction being entrained via a coupling means and being moved into an allocated support position, the coupling means are provided arranged on the guide carriages and the carriage and cooperating therewith, which are operable by switching means arranged fixed on the guide rail by which the guide carriages arranged in the feed direction can be automatically coupled with a respective one of the carriage or guide carriages in a subsequent displacement motion and by which entrained ones of the guide carriages upon reaching their respective support positions are automatically decoupled and placed, wherein the coupling means comprises a first coupling element provided on each of the guide carriages, which cooperates with a second coupling element arranged on at least one of the guide carriage or the carriage in an accumulating motion, with one of the coupling elements of a pair of the coupling elements being switchable between a locked position and an unlocked position, and the switching means comprises a switching ramp arranged on the guide rail in each area of a support position for the guide carriages, which switches the switchable coupling element of the guide carriage allocated to said support position during the displacement out of said support position into its locked position and during the displacement into the support position into its unlocked position, wherein the second coupling element is embodied as a locking pin arranged fixed on at least one of the guide carriage or the carriage, extending in the accumulating direction, which penetrates into a receiving bore of the guide carriage being coupled, and the first coupling element comprises a latch, adjustable perpendicularly to an axis of the locking pin that is engageable with a latching groove on the locking pin, which is operated via a switching cam arranged thereat and cooperating with the switching ramp in the unlocking direction, and the guide rail is U-shaped in cross-section, and the switching ramp is provided on a separate switching bar that is inserted into an allocated recess on an inside of a lateral wall of the guide rail.

2. The spindle drive according to claim 1, wherein the latch is pre-stressed by springs in a direction of a locking position.

3. The spindle drive according to claim 1, wherein a latching recess is provided on the switching bar to accept the switching cam of the allocated latch.

4. The spindle drive according to claim 1, wherein the guide carriage comprises a housing with a penetrating opening for the threaded spindle and a slide bush arranged in the penetrating opening and receiving and supporting the threaded spindle, and on the housing at least one receiving bore each is provided to receive a locking pin, at least one recess for accepting and guiding a bar, and the locking pin projecting in the feed direction.

5. The spindle drive according to claim 4, wherein the housing is embodied symmetrical with respect to a plane of symmetry perpendicular to a bottom wall of the guide rail and comprising the axis of the threaded spindle, with recess bores being arranged on both sides of the plane of symmetry each for a locking pin and one recess each for a latch with a switching cam arranged on at least one of a top or a bottom.

6. The spindle drive according to claim 5, wherein the bars are arranged such that one of the switching cams is arranged on a right side in reference to the feed direction and in an upper section of the housing, one of the switching cams is arranged at the right side in a lower section of the housing, one of the switching cams is arranged at a left side in the upper section, and one of the switching cams is arranged at the left side in the lower section of the housing, with the switching ramps being arranged accordingly at an interior side of a right lateral wall and a left lateral wall, respectively, in a position according to a height of the switching cams.

\* \* \* \* \*